United States Patent
Yazdanpanah et al.

(10) Patent No.: US 10,184,657 B2
(45) Date of Patent: Jan. 22, 2019

(54) PROCESS AND APPARATUS FOR CHEMICAL LOOPING REDOX COMBUSTION WITH CONTROL OF THE HEAT EXCHANGES

(71) Applicants: IFP Energies nouvelles, Rueil-Malmaison (FR); TOTAL RAFFINAGE CHIMIE, Courbevoie (FR)

(72) Inventors: Mahdi Yazdanpanah, Lyons (FR); Thierry Gauthier, Brignais (FR); Florent Guillou, Ternay (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 31 days.

(21) Appl. No.: 15/319,603

(22) PCT Filed: Jun. 18, 2015

(86) PCT No.: PCT/EP2015/063745
§ 371 (c)(1),
(2) Date: Dec. 16, 2016

(87) PCT Pub. No.: WO2015/193450
PCT Pub. Date: Dec. 23, 2015

(65) Prior Publication Data
US 2017/0321888 A1    Nov. 9, 2017

(30) Foreign Application Priority Data
Jun. 19, 2014 (FR) ...................................... 14 55668

(51) Int. Cl.
F23C 10/08 (2006.01)
B01J 8/30 (2006.01)
(Continued)

(52) U.S. Cl.
CPC ................. *F23C 10/08* (2013.01); *B01J 8/26* (2013.01); *B01J 8/30* (2013.01); *B01J 8/388* (2013.01);
(Continued)

(58) Field of Classification Search
CPC ..... F23C 2900/99008; F23C 2206/103; Y02E 20/346; F28D 13/00; B01J 2208/00141
See application file for complete search history.

(56) References Cited

U.S. PATENT DOCUMENTS 5,290,523 A * 3/1994 Koppelman ............... C10L 9/00
165/267

* cited by examiner

Primary Examiner — Kenneth Rinehart
Assistant Examiner — Logan Jones
(74) Attorney, Agent, or Firm — Fitch, Even, Tabin & Flannery, LLP (57) ABSTRACT

The invention relates to a process and to a unit for chemical looping oxidation-reduction combustion of a hydrocarbon feed, wherein heat exchanges are controlled through a level variation of a dense fluidized bed of active mass particles in an external heat exchanger (E1, E2), positioned on a transport line carrying particles circulating between a reduction zone (210) and an oxidation zone (200) for the particles in the chemical loop. The bed level variation is allowed through controlled application of a pressure drop on a fluidization gas outlet in the heat exchanger, said pressure drop being compensated by the level variation of an active mass particle bed in a reservoir zone provided on the particle circuit in the chemical loop.

16 Claims, 3 Drawing Sheets

(51) Int. Cl.
*B01J 8/38* (2006.01)
*F23C 99/00* (2006.01)
*B01J 8/26* (2006.01)

(52) U.S. Cl.
CPC ....... *F23C 99/00* (2013.01); *B01J 2208/0007* (2013.01); *B01J 2208/0061* (2013.01); *B01J 2208/00141* (2013.01); *B01J 2208/00176* (2013.01); *B01J 2208/00539* (2013.01); *F23C 2900/99008* (2013.01); *Y02E 20/346* (2013.01); *Y02E 50/32* (2013.01)

PROCESS AND APPARATUS FOR CHEMICAL LOOPING REDOX COMBUSTION WITH CONTROL OF THE HEAT EXCHANGES

CROSS-REFERENCE TO RELATED APPLICATIONS

This application is a U.S. national phase application filed under 35 U.S.C. § 371 of International Application No. PCT/EP2015/063745, filed Jun. 18, 2015, designating the United States, which claims priority from French Patent Application No. 14/55.668, filed Jun. 19, 2014, which are hereby incorporated herein by reference in their entirety for all purposes.

FIELD OF THE INVENTION

The present invention relates to the chemical looping oxidation-reduction combustion (CLC) of hydrocarbon feeds, and notably to the control of heat exchanges in such a chemical loop.

BACKGROUND OF THE INVENTION

In the text hereafter, what is referred to as chemical looping oxidation-reduction combustion (CLC) is an oxidation-reduction or redox looping process on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced. The reactors operate under fluidized bed conditions and the active mass circulates between the oxidation reactor and the reduction reactor. The circulating fluidized bed technology is used to enable continuous change of the active mass from the oxidized state thereof in the oxidation reactor to the reduced state thereof in the reduction reactor.

In a context of increasing world energy demand, capture of carbon dioxide ($CO_2$) for sequestration thereof has become an imperative necessity in order to limit greenhouse gas emissions harmful to the environment. The CLC process allows to produce energy from hydrocarbon-containing fuels while facilitating capture of the $CO_2$ emitted during the combustion.

The CLC process consists in using redox reactions of an active mass, typically a metal oxide, for splitting the combustion reaction into two successive reactions. A first oxidation reaction of the active mass, with air or an oxidizing gas, allows the active mass to be oxidized.

A second reduction reaction of the active mass thus oxidized, using a reducing gas, then allows to obtain a reusable active mass and a gas mixture essentially comprising $CO_2$ and water, or even syngas containing hydrogen and carbon monoxide. This technique thus enables to isolate the $CO_2$ or the syngas in a gas mixture practically free of oxygen and nitrogen.

Chemical looping combustion enables to produce energy from this process, in form of vapour or electricity for example. The feed combustion heat is similar to the heat encountered in conventional combustion. It corresponds to the sum of the reduction and oxidation heats in the chemical loop. The heat is generally extracted through exchangers arranged within or on the wall of, or inserted in the combustion and/or oxidation enclosures, on the fumes lines, or on the metal oxide transfer lines.

In addition to the advantage of recovering the combustion heat to produce energy, it is important to be able to control the temperature in a CLC process. Indeed, the temperature of the reactions in the oxidation and reduction zones needs to be controlled for safety reasons and in order to guarantee good performances of the process. This heat recovery for controlling the process heat is preferably achieved by heat exchange with the active mass circulating in the loop.

This heat recovery can be achieved at the walls of the redox reactors in a CLC process. However, this configuration may not be optimal, notably because the thermal exchanges are limited due to an exchange surface limited to the walls, and because only part of the particles is in contact with this exchange surface, but also because it is not always possible to modify the flow rate of the oxygen-carrying solid in these reactions zones for the sole purpose of heat exchange control. Indeed, the oxygen-carrying solid flow is directly related to the amount of oxygen used for combustion, and any change in the flow rate of the oxygen-carrying solid has an impact on the progress of the reactions, which may for example cause fuel management and/or reaction stoichiometry problems, and eventually affect the process yield.

Using heat exchangers outside the combustion and/or oxidation enclosures may be considered.

In general terms, such fluidized bed heat exchange devices are known in some fields such as circulating fluidized bed thermal power plants, and they are identified as fluidized bed heat exchangers (FBHE) or external heat exchangers (EHE). They generally come in form of a vessel comprising an inlet for a solid in form of particles, a fluidization device using a gas, a gas outlet and a solid outlet (Q. Wang et al., Chemical Engineering and Processing 42 (2003), 327-335).

To achieve heat exchange, tube bundles are conventionally provided in the fluidized bed so as to generate an exchange surface between the fluidized bed and a heat-carrying fluid circulating in the tubes. Conventionally, in the field of energy, in particular in thermal power plants, the heat-carrying fluid is pressurized boiler water that is either heated or at least partly vaporized, or overheated in the tube bundles of the heat exchanger. These exchangers generally operate with an overflow mechanism for discharge of the solid, as illustrated for example in patent U.S. Pat. No. 4,716,856 or by Wang et al. (Chemical Engineering and Processing 42, 2003, pp. 327-335). Using an overflow pipe implies that the volume of the fluidized bed is constant and therefore that the exchange surface with the fluidized bed is constant. This makes it impossible to modulate the heat recovery through a variation of this surface and requires modulating the operating parameters such as, for example, the flow of solid passing through the exchange zone.

A solid flow control device such as a mechanical valve, as described in patent EP-0,090,641 A2, can then be used. One drawback of this option is the use of a mechanical device for controlling the flow of solid. This type of device is particularly limitative in processes operating at high temperatures, such as a CLC process, and it can lead to reliability problems inherent in the implementation of a mechanical device comprising mobile parts in a bed of fluidized particles abrasive at high temperatures.

In order to regulate the flow of solids, it is possible to use nonmechanical valves such as the pneumatic valves described in patent application WO-2011/007,055, used to control the circulation of the solid active mass particles in a CLC process. This type of pneumatic valve allows to tackle the problem of temperature and abrasion. However, the smooth operation of these pneumatic valves is limited to the use of certain particle classes, namely the particles of group B in Geldart's classification.

Figure 1:
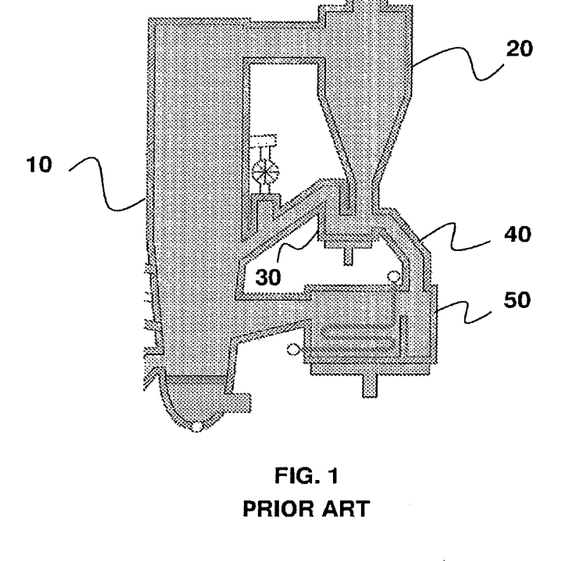
FIG. 1 is a diagram showing a by-pass system for heat exchange in a conventional coal combustion unit of a thermal power plant.

FIG. 1 (extracted from K. Shakourzadeh, Techniques de fluidisation, réf. J3390, Techniques de l'Ingénieur, p. 10) illustrates a particular system allowing to modify the flow of solid passing through an external fluidized bed heat exchanger operating with an overflow pipe, optionally with a valve on the solid stream entering the exchanger. This system is installed in a conventional circulating bed coal (air) combustion unit comprising a combustion reactor 10 from which a gas mixture containing the combustion gases and solid particles is sent to a cyclone 20. An external heat exchanger 50 equipped with an overflow pipe is arranged between cyclone 20 and reactor 10. According to this system, only part of the solid stream recovered in the bottom of cyclone 20 is sent through a pipe 40 to heat exchanger 50 prior to returning to reactor 10, the other part of the solid stream being sent back through the agency of a siphon/return leg assembly 30 to reactor 10. A valve is generally provided on pipe 40. Heat exchange is thus controlled by modifying the solid flow passing through exchanger 50. This configuration, consisting in a solid flow by-pass, complexifies the architecture of the unit and the process in which it is implemented, all the more so as it involves using a valve on the circuit of the solid so as to orient it towards the by-pass.

Generally, solutions consisting in modulating the flow of solid by means of a valve in order to modify the heat flux can affect the proper operation of the process and/or limit the operation thereof. For example, if it is desired to limit or even to cancel the exchange between the solid and the heat-carrying fluid, either the flow of solid needs to be limited or stopped, which can lead to the slowdown or standstill of the unit, or the circulation of the heat carrier has to be limited or stopped, which may damage the tube bundles of the heat exchanger.

There is thus a need for an improved CLC process wherein heat exchanges with the circulating oxygen carrier can occur within an external exchanger without using a valve on the solid flow for modifying the amount of exchanged heat. This need is all the more markedly felt as the temperature of the circulating fluidized bed of a CLC process can be substantially higher than with a conventional circulating fluidized bed (CFB) combustion process, depending on the nature of the oxygen carrier and on the feed treated, which makes it difficult to install a mechanical valve.

GOALS AND SUMMARY OF THE INVENTION

In this context, the invention aims to meet at least one of the following goals:
- overcome at least partly the aforementioned problems of the prior art,
- provide a simplified CLC process and unit, which do notably not require a by-pass system at the external heat exchanger and/or valves on the solid flow for regulating the amount of solid involved in the heat exchanger. Such a simplification tends to notably reduce the operating and investment costs. By avoiding in particular using valves on the flow of solid passing through the exchanger, notably mechanical valves, the invention allows the heat exchange control reliability to be increased,
- provide better control of the heat exchanges with the oxygen-carrying solid, in particular in terms of efficiency, precision, simplicity and rapidity,
- allow the temperature of the CLC process to be regulated, for example the temperatures for carrying out the reactions in the active mass reduction and oxidation zones, notably in order to control the process performances and the safety in the CLC unit,
- control the amount of heat exchanged with the active mass circulating in the chemical loop while keeping a nearly constant active mass flow rate in the reduction and oxidation zones.

Thus, in order to reach at least one of the aforementioned goals, among others, the present invention provides, according to a first aspect, a process for chemical looping oxidation-reduction combustion of a hydrocarbon feed wherein a redox active mass in form of particles circulates between an oxidation zone and a reduction zone so as to form a circuit wherein:
- combustion of said hydrocarbon feed is carried out by contacting with the redox active mass particles in the reduction zone,
- the redox active mass particles from the reduction zone are oxidized by contacting with an oxidizing gas stream in the oxidation zone,
- the particles are sent to at least one heat exchanger positioned on a particle transport line between the reduction zone and the oxidation zone, and a fluidization gas is sent into said exchanger so as to create a dense fluidized bed comprising the active mass particles, said heat exchanger comprising a heat exchange surface in contact with the fluidized bed,
- the heat recovery is controlled in said at least one heat exchanger by varying the fluidized bed level through controlled application of a pressure drop on a fluidization gas outlet positioned in an upper part of the heat exchanger, the pressure drop applied being compensated by the level variation of an active mass particle bed in a reservoir zone provided on the particle circuit in the chemical loop.

According to one embodiment, the active mass particles are sent to the reservoir zone provided upstream from the heat exchanger, said reservoir zone and said heat exchanger being contained in a single enclosure provided with a wall that vertically separates the enclosure into a first part forming the reservoir zone and a second part forming the heat exchanger, and the pressure drop applied in the heat exchanger is compensated by a level variation of the particle bed, preferably fluidized, in the reservoir zone communicating with the fluidized bed of the heat exchanger through a passage in the enclosure wall.

According to another embodiment, the active mass particles are sent to the heat exchanger through an inlet leg of the heat exchanger, said inlet leg forming the reservoir zone.

Advantageously, the active mass particles are discharged from the heat exchanger through a pipe arranged in the lower part of the heat exchanger, said pipe having the form of a siphon.

Preferably, the opening of a mechanical valve positioned on the fluidization gas outlet of the heat exchanger is controlled for controlled application of the pressure drop.

Advantageously, the temperature of the controlled pressure drop application means positioned on the fluidization gas outlet outside said heat exchanger is controlled. Said controlled pressure drop application means can thus be cooled by contacting with a cooling fluid circulation circuit.

Preferably, the heat exchange is carried out on a transport line carrying the active mass particles from the reduction zone to the oxidation zone.

According to a second aspect, the invention relates to a unit for chemical looping oxidation-reduction combustion of a hydrocarbon feed according to the invention, comprising:
- a reduction zone for combustion of the hydrocarbon feed on contact with an active mass in form of particles,
- an oxidation zone for oxidation of the active mass particles from the reduction zone on contact with an oxidizing gas stream,
- at least one active mass particles transport line between the reduction zone and the oxidation zone,
- a heat exchange control device comprising:
    - a heat exchanger positioned on said at least one transport line and comprising:
        - an inlet for an incoming stream of active mass particles,
        - fluidization gas injection means for forming a dense fluidized bed of active mass particles,
        - an outgoing fluidization gas outlet provided in an upper part of the heat exchanger, said outlet comprising controlled pressure drop application means,
        - an outlet for an outgoing stream of active mass particles provided in a lower part of the heat exchanger,
        - a heat exchange surface in contact with the dense fluidized particle bed,
    - a reservoir zone for compensating the pressure drop applied on the fluidization gas outlet of the heat exchanger, said reservoir zone being positioned on the particle circuit of the chemical loop provided between the reduction zone and the oxidation zone.

According to an embodiment, the heat exchanger and the reservoir zone consist of a single enclosure provided with a wall that vertically separates said enclosure into a first part forming the reservoir zone upstream from a second part forming the heat exchanger, the reservoir zone preferably comprising means for injecting a fluidization gas, said wall comprising a passage for the active mass particle bed from the reservoir zone to the heat exchanger, the particles flowing in through a pipe provided in the upper part of the reservoir zone.

According to an embodiment, the active mass particles flow into the heat exchanger through an inlet leg of the heat exchanger, said inlet leg forming the reservoir zone.

Advantageously, the outgoing particle stream in the heat exchanger flows out through a pipe provided in the lower part of the heat exchanger, said pipe having the form of a siphon.

Preferably, controlled application of the pressure drop is achieved through a mechanical valve positioned on the fluidization gas outlet of the heat exchanger.

Preferably, the controlled pressure drop application means are arranged on the fluidization gas outlet outside said heat exchanger.

Advantageously, the unit comprises means for cooling said controlled pressure drop application means, preferably a cooling liquid circulation circuit in contact with said controlled pressure drop application means.

Preferably, the unit comprises a first particle transport line for carrying the active mass particles from the reduction zone to the oxidation zone, a second particle transport line for carrying the active mass particles from the oxidation zone to the reduction zone, and the heat exchanger is positioned on at least the first particle transport line.

BRIEF DESCRIPTION OF THE FIGURES

Other features and advantages of the invention will be clear from reading the description hereafter of embodiments given by way of non limitative example, with reference to the accompanying figures wherein.

In the figures, the same reference numbers designate identical or similar elements.

DETAILED DESCRIPTION

In the present description, the expressions "oxygen carrying material" and "redox active mass" are equivalent. The redox mass is referred to as active in connection with the reactive capacities thereof, in the sense that it is capable of acting as the oxygen carrier in the CLC process by capturing and releasing oxygen. The abbreviated expression "active mass" or the term "solid" can also be used.

Active Mass and Feeds Treated in the CLC Process According to the Invention

In the CLC process according to the invention, the hydrocarbon feeds treated can be solid, liquid or gaseous hydrocarbon feeds: gaseous (e.g. natural gas, syngas, biogas), liquid (e.g. fuel, bitumen, diesel, gasolines, etc.) or solid (e.g. coal, coke, pet coke, biomass, bituminous sands, etc.) fuels.

The redox mass can consist of metal oxides such as, for example, Fe, Ti, Ni, Cu, Mn, Co, V oxides, alone or in admixture, which can be derived from ores (ilmenite or pyrolusite for example) or synthetic (for example nickel oxide particles supported on alumina $NiO/NiAl_2O_4$), with or without a binder, and it has the required redox properties and the characteristics necessary for fluidization. The oxygen storage capacity of the redox mass advantageously ranges, depending on the type of material, between 1 and 15 wt. %. Advantageously, the amount of oxygen actually transferred by the metal oxide ranges between 1 and 3 wt. %, which allows to use only a fraction of the oxygen transfer capacity, ideally less than 30% thereof, so as to limit the risk of mechanical aging or agglomeration of the particles. Using only a fraction of the oxygen transport capacity also affords the advantage that the fluidized bed acts as a thermal ballast and thus smoothes the temperature variations over the path through the bed.

The active mass comes as fluidizable particles belonging to groups A, B or C of Geldart's classification. By way of non-limitative example, the redox mass particles can belong to group B of Geldart's classification, with a grain size such that over 90% of the particles have a size ranging between 100 μm and 500 μm, preferably between 150 μm and 300 μm, for a density ranging between 1000 $g/m^3$ and 5000 $kg/m^3$, preferably between 1500 $g/m^3$ and 4000 $kg/m^3$. The present invention is also particularly well suited to the use of active mass particles belonging to group A of Geldart's classification, notably because the invention allows to do away with valves on a solid flow, in particular pneumatic valves, for controlling heat exchanges.

The redox active mass can be subjected to an activation stage so as to increase the reactive capacities thereof; it can consist of a temperature rise stage, preferably progressive, and preferably in an oxidizing atmosphere (in air for example).

CLC Process According to the Invention

Figure 2:
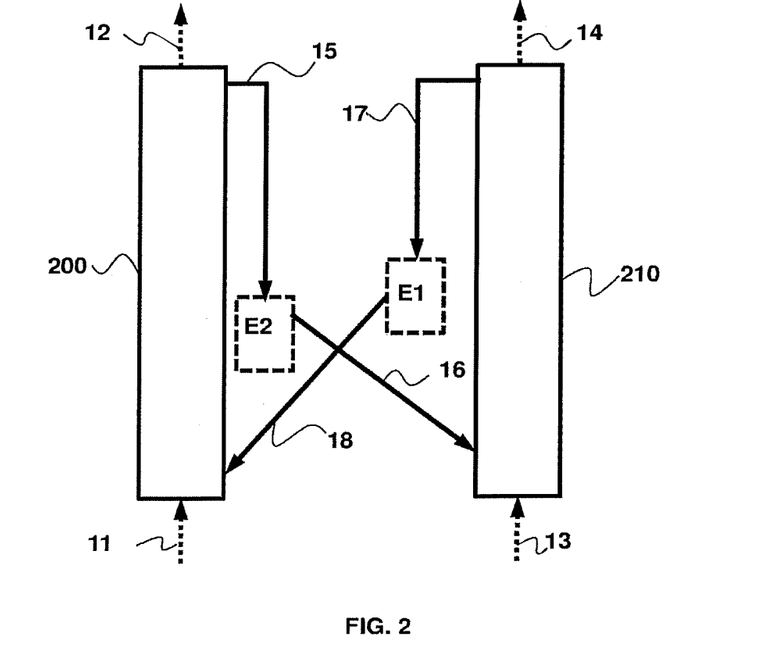
FIG. 2 is a diagram of a CLC unit according to the invention.

FIG. 2 diagrammatically illustrates the implementation of the CLC process according to the invention.

The CLC unit comprises an oxidation reaction zone 200 and a reduction reaction zone 210, each zone comprising at least one fluidized bed reactor, a redox active mass in form of particles circulating between each zone so as to form a redox loop. The active mass is carried from reduction zone 210 to oxidation zone 200 through a first transport line (17, 18) and from oxidation zone 200 to reduction zone 210 through a second transport line (15, 16). These transport lines can comprise active mass recycle lines enabling part of the active mass from a reaction zone to be sent back to this reaction zone. It is understood that these transport lines can comprise various devices such as, by way of non exhaustive example, solid flow control devices such as valves, gas/solid separation devices, elutriation devices or sealing elements such as siphons.

Reduction zone 210 comprises fluidized bed operation means, hydrocarbon feed delivery means, active mass supply means, an outlet for a mixture consisting of the combustion gases and the reduced active mass particles.

Oxidation zone 200 is provided with a supply for the active mass reduced in the reduction zone, an oxidizing gas supply and an outlet for a mixture consisting of the oxygen-depleted oxidizing fluidization gas and the oxidized active mass particles.

According to the invention, at least one heat exchanger is arranged on a transport line between the two reaction zones. Thus, a heat exchanger E1 can be positioned on the first transport line between reduction zone 210 and oxidation zone 200, and it is traversed by any stream of active mass particles from reduction zone 210. According to another configuration, a heat exchanger E2 is arranged on the second transport line between oxidation zone 200 and reduction zone 210, and it is traversed in the same way by any stream of active mass particles from oxidation zone 200. According to the invention, each one of the two transport lines can comprise a heat exchanger. Several heat exchangers can also be provided on the same transport line.

The heat exchanger and its operation are detailed below in connection with FIG. 3. The heat exchanger is associated with a reservoir zone (not shown) provided on the particle circuit of the chemical loop formed between reduction zone 210 and oxidation zone 200 so as to form a heat exchange control device. The reservoir zone is also detailed below in connection with FIG. 3.

In the CLC process according to the invention, hydrocarbon feed 13 is sent to reduction zone 210 and contacted with a redox active mass in form of particles supplied through a pipe 16 of the second transport line.

Active mass $M_xO_y$, M representing a metal, is reduced to state $M_xO_{y-2n-m/2}$, through the agency of hydrocarbon feed $C_nH_m$, which is correlatively oxidized to $CO_2$ and $H_2O$ according to reaction (1) below, or possibly to mixture $CO+H_2$ depending on the proportions used.

$$C_nH_m + M_xO_y \rightarrow nCO_2 + m/2\, H_2O + M_xO_{y-2n-m/2} \qquad (1).$$

Combustion of the feed on contact with the active mass is performed at a temperature generally ranging between 600° C. and 1400° C., preferably between 800° C. and 1000° C. The contact time varies depending on the type of combustible feed used. It typically ranges between 1 second and 10 minutes, for example preferably between 1 and 5 minutes for a solid or liquid feed, and for example preferably between 1 and 20 seconds for a gaseous feed. The mass ratio of the amount of circulating active mass to the amount of oxygen to be transferred between the two reaction zones advantageously ranges between 30 and 100, preferably between 40 and 70.

A mixture comprising the gases resulting from the combustion and the active mass particles is discharged at the top of reduction zone 210. Gas/solid separation means (not shown) such as a cyclone allow combustion gases 14 to be separated from the solid active mass particles. These particles are sent to a heat exchanger E1 allowing to recover the heat from the solid active mass particles, prior to being sent through a pipe 18 to oxidation zone 200 where they are oxidized, at least partly, at a temperature generally ranging between 600° C. and 1400° C., preferably between 800° C. and 1000° C.

In oxidation reactor 200, the active mass is restored to its oxidized state $M_xO_y$ on contact with an oxidizing gas 11 such as air, according to reaction (2) below, prior to returning to reduction zone 210 through a second transport line (15, 16), after being separated from oxygen-depleted oxidizing gas 12 discharged at the top of oxidation zone 200.

$$M_xO_{y-2n-m/2} + (n+m/4)O_2 \rightarrow M_xO_y \qquad (2).$$

The active mass that alternatively goes from the oxidized form to the reduced form thereof, and vice versa, follows a redox cycle.

A heat exchanger E2 can be positioned on this second transport line according to an alternative configuration to that with heat exchanger 1.

It may be advantageous to arrange one or more heat exchangers on both transport lines between the reaction zones, according to the reduction and oxidation heat distribution in the process. This distribution greatly depends on the active masses (metal oxides notably) used for conducting the chemical looping combustion. In some cases, the exothermicity is distributed among the oxidation and the reduction of the active mass. In other cases, the oxidation is highly exothermic and the reduction is endothermic. In any case, the sum of the reaction heats in the oxidation and reduction zones is equal to the combustion heat of the fuel.

Preferably, the heat exchange occurs in at least one heat exchanger E1 provided on the first transport line connecting reduction zone 210 to oxidation zone 200. Indeed, the oxidation of the active mass is more frequently exothermic. In this case, in order to prevent too great a temperature rise in oxidation zone 200, it is advantageous to perform the heat exchange upstream from this oxidation zone.

In the method according to the invention, it is possible to control the heat exchange with the active mass by modifying the amount of active mass within the heat exchanger by controlling the pressure balance of a device comprising the heat exchanger and a reservoir zone, and more precisely by controlling the pressure drops in this device.

Heat Exchange Control According to the Invention

Figure 3:
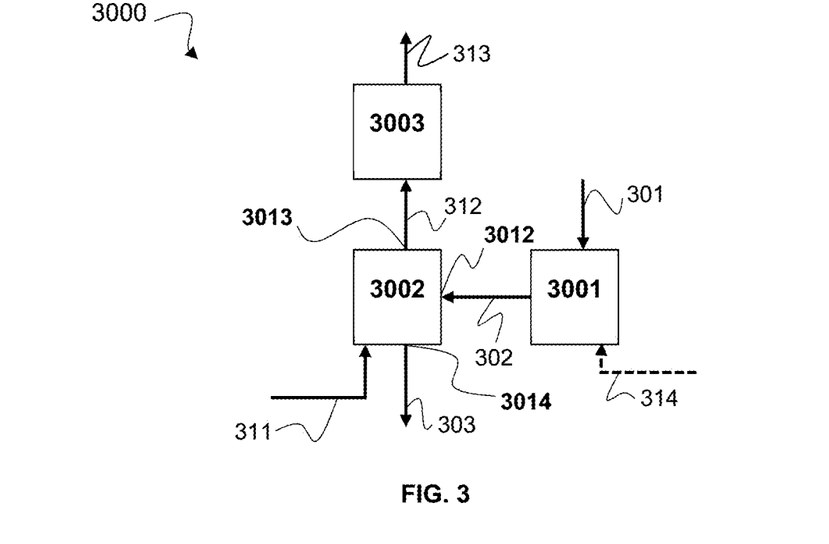
FIG. 3 is a diagram showing the general principle of the heat exchange control device according to the invention, FIG. 4 diagrammatically shows a first embodiment of the heat exchange control device according to the invention.

FIG. 3 diagrammatically illustrates the operating principle of the heat exchange control device in the CLC process according to the invention.

Heat exchange control device 3000 comprises:
  a fluidized bed heat exchanger 3002 positioned on a transport line as described above, receiving the active mass particle stream from a reaction zone, and
  an active mass reservoir zone 3001, also referred to as reservoir zone in the rest of the description.

Heat exchanger 3002 comprises a heat exchange surface, not shown in FIG. 3, for recovering the heat of a fluidized active mass particle bed which it is in contact with. This heat exchange surface can be materialized by tube bundles within which a heat-carrying fluid circulates, and the bundles can be fastened to the walls of an enclosure forming the heat exchanger. Such a tube bundle device is well known to the person skilled in the art. The heat exchanger can be used equally for heating or cooling the fluidized bed. The heat-carrying fluid preferably is water, for example pressurized water from a boiler. The water can be either heated or at least partly vaporized, or overheated in the tube bundles.

Heat exchanger 3002 also comprises:
- an inlet 3012 for the inflowing stream of active mass particles 302,
- fluidization gas injection means 311 for forming a fluidized active mass particle bed,
- an outlet 3013 for the outgoing fluidization gas 312 positioned in an upper part of the heat exchanger, said outlet comprising controlled pressure drop application means 3003,
- an outlet 3014 for an outgoing stream of active mass particles 303 positioned in a lower part of the heat exchanger.

A circulating bed of active mass 302 that has transited through a reservoir zone 3001 is fed into heat exchanger 3002. The temperature of the bed is 800° C. for example. Heat exchanger 3002 operates with a fluidized bed. Fluidization of the active mass particles fed into exchanger 3002 is provided by the injection of fluidization gas 311.

The fluidized bed created in the heat exchanger is a dense fluidized bed promoting thermal exchanges. It is referred to as dense fluidized bed as opposed to a dilute fluidized bed insofar as it behaves like a (dense) liquid rather than like a gas when it is transported pneumatically.

A dense fluidized bed is understood to be a fluidized bed wherein the gas fraction $\varepsilon_g$ is less than 0.9, preferably less than 0.8. A dilute fluidized bed is understood to be a fluidized bed wherein the volume fraction of redox active mass particles is less than 10 vol. %.

The nature of the fluidization gas is so selected as to be compatible with the process. Overheated water vapour, air or $CO_2$ is for example used.

This notion of compatibility is important within the context of a CLC process insofar as the best sealing possible is sought between the oxidation and reduction zones, on the one hand in order to guarantee the highest capture ratio and, on the other hand, to guarantee the best quality possible for the $CO_2$ captured. Besides, this notion of compatibility is also important as regards the current safety standards that need to be met in order to prevent, for example, any risk of oxidizer-fuel mixing due to the supply of an unsuitable fluidization gas (like air) on contact with a hydrocarbon combustion zone and in the absence of sealing devices such as siphons.

Air or water vapour is thus preferably used as the fluidization gas in the heat exchanger when the latter is positioned on a transport line directed towards the oxidation zone comprising no sealing element such as a siphon. $CO_2$, water vapour, a mixture thereof or combustion fumes are preferably used as the fluidization gas in the heat exchanger when the latter is positioned on a transport line directed towards the reduction zone comprising no sealing element such as a siphon.

Using neutral gases such as nitrogen is possible as long as it does not impact the quality of the $CO_2$ produced, for example by ensuring that sealing devices are provided. In the absence of such sealing devices, neutral gases are preferably used only if the heat exchanger is positioned on a transport line directed towards the oxidation zone, or only in limited amounts when the heat exchanger is positioned on a transport line directed towards the reduction zone, in order to comply with the standards relative to incondensable gas in the $CO_2$ stream produced for the transportation and/or storage thereof, typically less than 5 mol. %.

In some cases, injection of the fluidization gas can be achieved in form of multiple injections (not shown).

Advantageously, heat exchanger 3002 can be the seat of reactions between the active mass and gaseous reactants, and the reaction time can then be adjusted by the level of the solid, i.e. the height of solid traversed by the gas. In this case, the fluidization gas can comprise a carrier gas, gaseous reactants or a mixture thereof.

The fluidization gas, after fluidizing the active mass particles, and possibly reacting therewith, leaves the heat exchanger in form of a gaseous effluent 312.

Active mass particles 303 are discharged from heat exchanger 3002, for example at a temperature of 700° C. Extraction of the heat exchanger bed can be achieved by any means known to the person skilled in the art, in accordance with the operation of the CLC process.

The level of the fluidized bed of active mass particles can vary in the heat exchanger, thus causing a change in the effective heat exchange surface in contact with the bed, i.e. the fraction of the exchange surface immersed in the fluidized bed, which allows the amount of exchanged heat to be modulated. This bed height variation is performed through means 3003 for controlled application of a pressure drop at fluidization gas outlet 3013, for example by means of a valve positioned on the fluidization gas outlet.

A pressure drop is applied to gaseous effluent 312 leaving the exchanger (outgoing fluidization gas), which results in a low-pressure gaseous effluent 313.

The valve opening variation enables to perform a controlled application of a pressure drop at this point. The principle of the fluidized bed level control in the heat exchanger is based on the pressure balance (I) in the heat exchange control device (heat exchanger+reservoir zone):

$$Pin + \Delta P1 = \Delta P2 + \Delta Pv + Pout \qquad (I)$$

with:
Pin: pressure at the solid inlet
$\Delta P1$: pressure drop of the reservoir zone
$\Delta P2$: pressure drop of the heat exchanger
$\Delta Pv$: pressure drop of the valve
Pout: pressure at the gas outlet of the heat exchanger.

The bed level can thus be calculated by relation (II) as follows:

$$Hlit = (Pin + \Delta P1 - \Delta Pv - Pout)/(\rho bulk \cdot g) \qquad (II)$$

Hlit: bed level (height)
$\rho$bulk: bulk density of the bed
g: gravity constant.

The height of the fluidized bed depends on the temperature of the bed, the superficial velocity of the gas in the heat exchanger, the density and the size of the active mass particles. The variation of the amount of solid supplied to the heat exchanger after controlled application of the pressure drop allows the height of the fluidized bed to be varied, all the other parameters being constant.

An important element in this operation is the management of the total inventory, i.e. the amount of active mass in the CLC unit at a given time. Control of the heat exchange according to the invention is based on the siphon concept according to which the pressure drop increase in the heat exchanger is absorbed by the solid level variation in the reservoir zone. This provides an additional degree of freedom in cases where this reservoir zone and the heat exchanger make up a single assembly positioned at a given point of the CLC unit, which avoids changing the operating conditions elsewhere in the CLC unit during the solid inventory variation in the heat exchange control device.

According to the invention, the solid distribution in the heat exchange control device is automatically adjusted according to the imposed pressure drop, as in a siphon (loop seal). This principle is described by Yazdanpanah et al., 2013 ("An experimental investigation of loop-seal operation in an interconnected circulating fluidized bed system", Powder Technology, Volume 237, March 2013, pp. 266-275, ISSN 0032-5910).

The pressure drop applied at the valve is compensated by the level variation of an active mass particle bed in reservoir zone 3001.

This zone 3001 forms an active mass reservoir located at a given point on the particle circuit of the chemical loop formed between the reduction zone and the oxidation zone, for example upstream from the heat exchanger and downstream from the reaction zone where the particles come from. Reservoir zone 3001 can be a fluidized bed or a moving fixed bed depending on the properties of the particles used and on the design of the unit. The reservoir zone can be an existing vessel of the CLC unit. The reservoir zone receives a stream of particles 301 at a pressure Pin. The reservoir zone can have a dedicated fluidization 314, for example when it comprises a fluidized bed of active mass particles.

This reservoir zone can be, for example, the solid inlet leg in the heat exchanger.

Controlled pressure drop application means 3003 can comprise a mechanical valve, rotary or linear, preferably connected to the process regulation automaton so as to control its opening/closing. By way of non limitative example, a butterfly valve can be used.

A major advantage afforded by such mechanical valves is the precision obtained. Indeed, this type of valve allows fine regulation (for example +/−5 microns) and short response times (instantaneous to some seconds).

According to an embodiment, controlled pressure drop application means 3003 are arranged outside heat exchanger 3002 so that the temperature of said means can be controlled through natural convection with the ambient air, or through dedicated cooling applied to means 3003, such as a cooling water circulation. One advantage of this configuration is that this cooling has no significant impact on the fluidized bed temperature.

Heat exchanger 3002 can be the seat of reactions between the active mass and gaseous reactants, as described above, for example the seat of an oxidation reaction of the active mass in contact with water vapour, which could result in the production of dihydrogen depending on the nature of the active mass, for example in the case of a reduced form of iron oxide. Furthermore, it can be possible to use a CLOU (Chemical Looping with Oxygen Uncoupling) effect, i.e. an effect of spontaneous gaseous oxygen release by the redox active mass when it is under low $O_2$ partial pressure, in cases where the heat exchanger is positioned downstream from oxidation zone 200, on a transport line from oxidation zone 200 to reduction zone 210. Indeed, the residence time of the active mass from the oxidation zone in the heat exchanger can contribute to the occurrence of this effect, depending on the active mass used, and thus allow to use the gaseous oxygen in the reduction zone for combustion of the feed.

Heat exchanger 3002 or reservoir zone 3001 can also have other functions than heat exchange or buffer zone respectively, they can for example comprise an elutriation zone intended for separation of the fine and light particles from coarser and/or denser particles, as may be useful, by way of non exhaustive example, in case of combustion of solid hydrocarbon feeds generating ashes and/or solid unburnts, or to limit the proportion of fines resulting from the attrition of the active mass. This involves the advantage of limiting the number of elements in the unit and therefore of simplifying the unit while reducing the costs. The principle of separation by elutriation consists in subjecting a fluidized bed consisting of a mixture of fine light particles and coarser and/or denser particles to a gas stream whose velocity is adjusted in such a way that the finer and lighter particles are carried out of the fluidized bed by the carrier gas, by discrimination of the terminal velocities of the particles.

Heat exchanger 3002 is suited to such a separation, the regulation of the fluidized bed level being decorrelated from the velocity of the fluidization gas, whose velocity can thus be adapted to the elutriation of a particular solid population.

When heat exchanger 3002 is also used as an elutriation zone, the finer light solid particles can be discharged through fluidization gas outlet 3013. The outgoing gas stream then comprises a small amount of solid particles that do not affect the operation of the heat exchange control device according to the invention. Gas fraction $\varepsilon_g$ from the gas mixture leaving through outlet 3013 is preferably greater than 0.90, more preferably greater than 0.98.

Reservoir zone 3001 can also be an elutriation device positioned on the particle circuit in the chemical loop.

The present invention allows to control heat exchanges with the active mass in the process, which allows to control the temperature through the active mass particles in the reduction and oxidation reaction zones. According to the invention, it is notably possible to control the temperature in the CLC process without modifying the redox active mass inventory in the process.

It is thus possible to control for example the temperature in the reduction and oxidation zones by removing the heat produced by the global combustion of the fuel (sum of the oxidation and reduction heats).

The invention enables for example to regulate the temperature in response to operating changes brought to the process, such as a hydrocarbon feed injection increase, which requires recovering more heat to maintain the optimum temperature conditions for the combustion.

It can be noted that, in general, the heat is extracted from the active mass so as to cool it. In some cases, it may be advantageous to supply heat to the active mass particles, for example when they need to be activated again through a temperature rise, so as to increase the reactive capacities thereof.

The present invention notably involves the following advantages:
  heat exchange control according to the invention allows to do away with mechanical or pneumatic valves on the active mass particle flow for varying the fluidized bed level in the heat exchanger, or more generally for controlling heat exchanges in a heat exchanger, considering that such valves are particularly sensitive to erosion through particles and that they are complicated to use on solid streams;
  heat exchange control according to the invention enables all of the active mass particle flow to pass through the heat exchanger, without requiring by-pass systems, which allows to simplify the CLC unit and to reduce the operating and investment costs;

pressure drop control in a gas phase, in gaseous effluent 312 leaving the heat exchanger, affords the advantage of being simple, reliable, precise and rapid, compared to control of a solid particle stream;

heat exchange control is very effective notably because the level variation of the particle fluidized bed in the heat exchanger causes the heat exchange surface in contact therewith to vary, which directly conditions the heat exchange.

Figure 4:
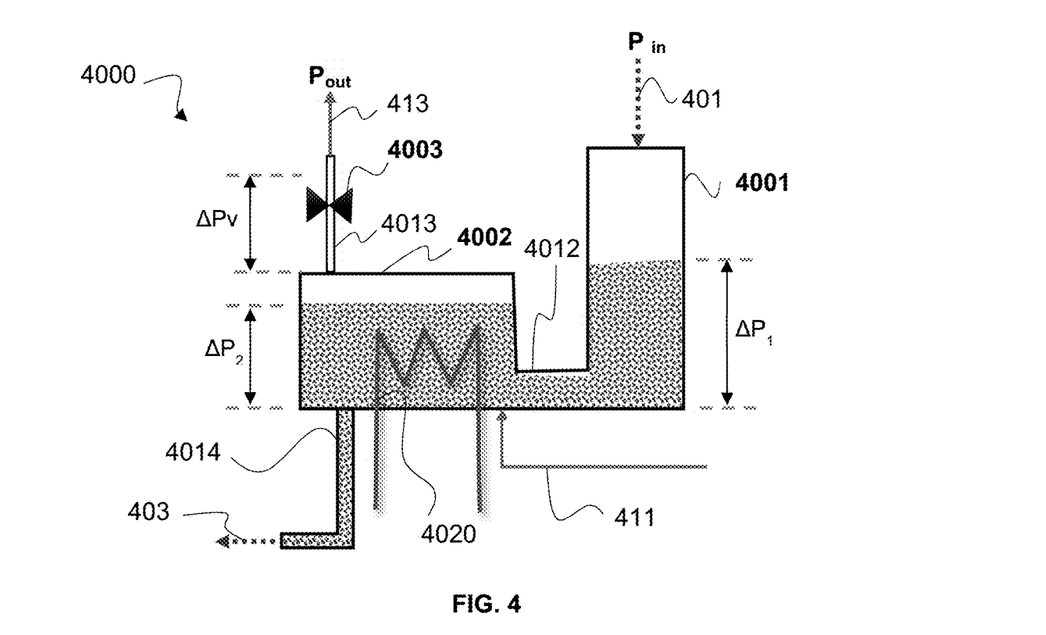
Figure 5:
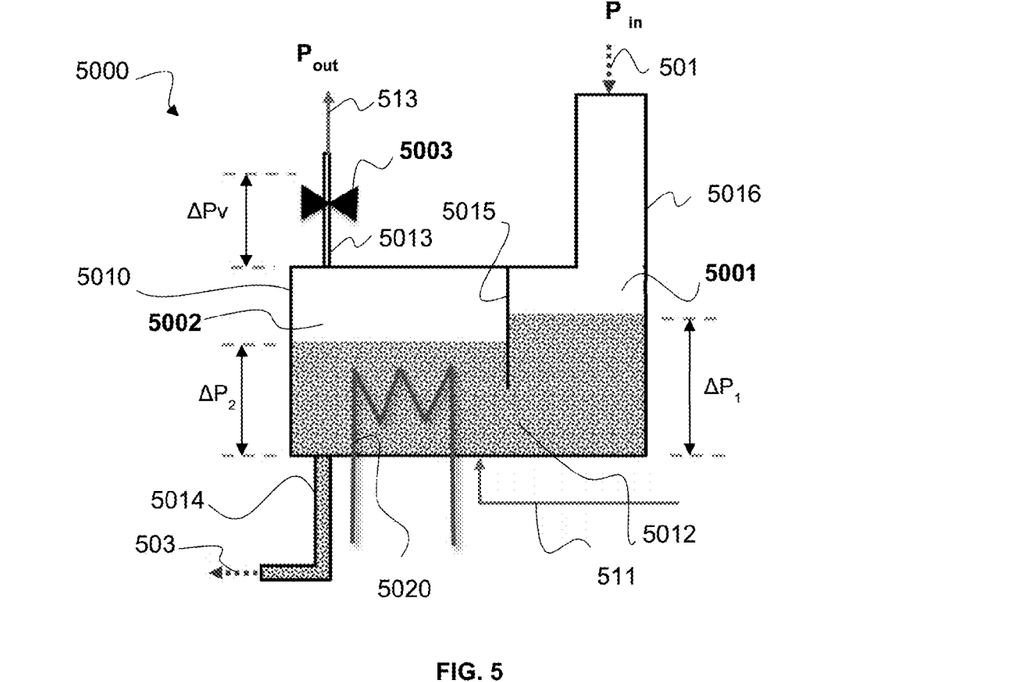
FIG. 5 is a diagram showing a second embodiment of the heat exchange control device according to the invention.
Figure 6:
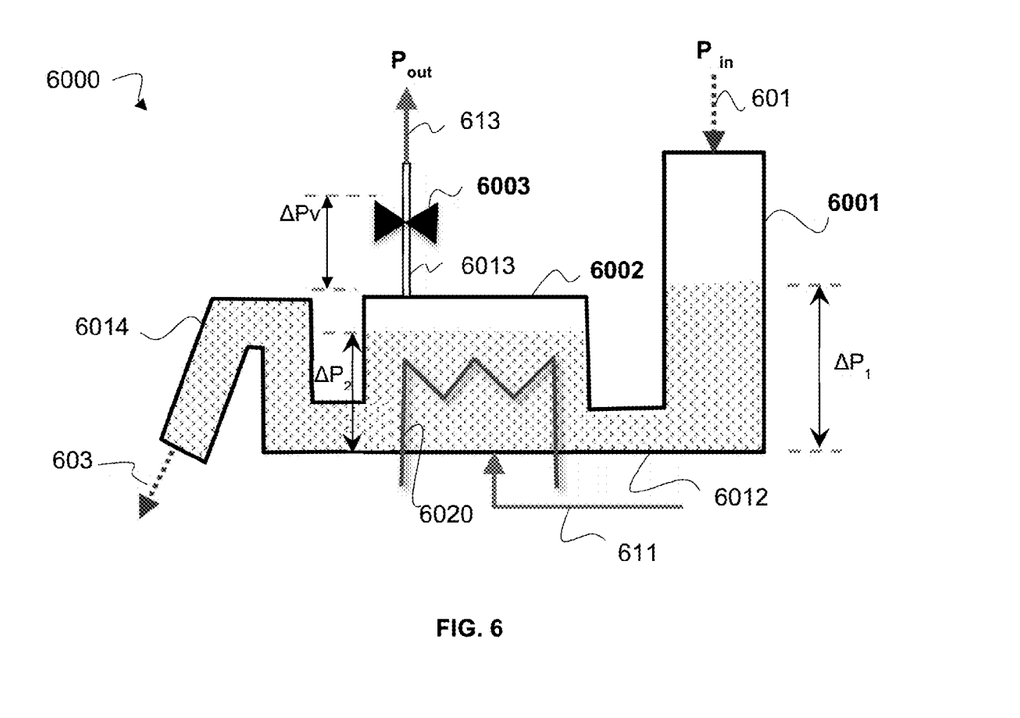
FIG. 6 is a diagram showing a third embodiment of the heat exchange control device according to the invention.

FIGS. 4 to 6 illustrate various embodiments of the heat exchange control device, in particular various embodiments wherein the reservoir zone is physically associated with the heat exchanger so as to form a single assembly installed on a particle transport line between the reduction zone and the oxidation zone. These configurations allow to avoid the active mass inventory variation in the other parts of the CLC unit.

According to a first embodiment of the invention, as diagrammatically illustrated in FIG. 4, heat exchange control device 4000 comprises a heat exchanger 4002, as generally described in FIG. 3, and a pipe 4001 forming the reservoir zone, said pipe opening into the fluidized bed of exchanger 4002. Pipe 4001 opens into the lower part of exchanger 4002, permanently immersed in the active mass particle fluidized bed.

Pipe 4001 is for example the inlet leg for inflow of the solid active mass particles into the heat exchanger.

Pipe 4001 can consist of a substantially vertical channel portion and of a substantially horizontal channel portion 4012, the two portions being connected by an elbow. Substantially horizontal channel portion 4012 opens into the lower part of exchanger 4002 and it can even have the same reference level as the heat exchanger, consisting of the bottom of the heat exchanger.

The particle bed in the reservoir zone is preferably a moving particle bed driven by gravity. It can also be a fluidized bed. In this case, the reservoir zone can comprise fluidization means (not shown) allowing the particle bed flow towards the heat exchanger to be facilitated.

Heat exchanger 4002 comprises:
- an inlet 4012 for an incoming stream of active mass particles,
- fluidization gas injection means 411 for forming a fluidized bed of active mass particles,
- a fluidization gas outlet 4013 provided in an upper part of heat exchanger 4002, said outlet comprising a valve 4003 for controlled pressure drop application,
- an active mass particle outlet 4014 provided in a lower part of heat exchanger 4002, and
- a heat exchange surface 4020 for recovering the heat of the fluidized particle bed.

According to this first embodiment, active mass particles 401 are sent to heat exchanger 4002 through pipe 4001, at a given particle inlet pressure $P_{in}$. A pressure drop $\Delta P_V$ is then applied in a controlled manner through valve 4003 positioned on fluidization gas outlet 4013, which is arranged outside heat exchanger 4002, so as to form a gaseous effluent 413 at a low pressure $P_{out}$. Pressure drop $\Delta P_2$ applied in heat exchange zone 4002 is compensated by a particle bed level variation $\Delta P_1$ in reservoir zone 4001 so as to meet the pressure balance according to Equation (1). Active mass particles 403 are discharged through outlet pipe 4014 arranged in the lower part of heat exchanger 4002.

FIG. 5 diagrammatically illustrates a second embodiment of heat exchange control device 5000 wherein heat exchanger 5002 and reservoir zone 5001 consist of a single enclosure 5010 provided with a wall 5015 vertically separating said enclosure 5010 into a first part forming reservoir zone 5001 upstream from a second part forming heat exchanger 5002.

Separation wall 5015 comprises a passage 5012 for the active mass particle bed from reservoir zone 5001 to heat exchanger 5002. Heat exchanger 5002 comprises means 511 for injecting a fluidization gas so as to form an active mass particle fluidized bed in the heat exchanger. Preferably, reservoir zone 5001 operates under fluidized bed conditions like heat exchanger 5002 and it thus preferably comprises fluidization gas injection means (not shown). The fluidization gas is of the same nature as the gas used for the heat exchanger and described above in connection with FIG. 3.

The active mass particles flow into the device through a pipe 5016 arranged in the upper part of reservoir zone 5001, and active mass particles 503 are discharged through a pipe 5014 in the lower part of heat exchanger 5002.

According to this second embodiment, active mass particles 501 are sent to reservoir zone 5001 through pipe 5016, at a given particle inlet pressure $P_{in}$. A pressure drop $\Delta P_V$ is then applied in a controlled manner through valve 5003 positioned on fluidization gas outlet 5013 in an upper part of heat exchanger 5002, more precisely outside heat exchanger 5002, so as to form a gaseous effluent 513 at a low pressure $P_{out}$. Pressure drop $\Delta P_2$ applied in heat exchange zone 5002 is compensated by a particle bed level variation $\Delta P_1$ in reservoir zone 5001 so as to meet the pressure balance according to Equation (1). Active mass particles 503 are discharged through outlet pipe 5014.

The fluidized bed level in heat exchanger 5002 can thus vary according to the pressure drop applied by valve 5003, thus allowing heat exchange surface 5020 effectively in contact with the fluidized particle bed to be varied in order to control the heat recovery in exchanger 5002.

FIG. 6 diagrammatically illustrates a third embodiment wherein heat exchange control device 6000 comprises a heat exchanger 6002 and a reservoir zone 6001 similar to those described in connection with FIG. 4, except for active mass particle stream outlet 603 of heat exchanger 6002. The elements identical to the heat exchanger and the reservoir zone of FIG. 4 are not described again here.

According to this embodiment, particle stream outlet 6014 is a pipe with a shape similar to a siphon. In this case, the fluidized bed level in heat exchanger 6002 is at equilibrium with the pressure at outlet 6014 of particle stream 603 as in the operation of a siphon. This embodiment advantageously allows to combine the ease of operation of an overflow exchanger and the control of the bed level in the exchanger as described.

According to this embodiment, active mass particles 601 are sent to heat exchanger 6002 through pipe 6001, at a given particle inlet pressure $P_{in}$. A pressure drop $\Delta P_V$ is then applied in a controlled manner through valve 6003 positioned on fluidization gas outlet 6013 in an upper part of heat exchanger 6002, in particular outside heat exchanger 6002, so as to form a gaseous effluent 613 at a low pressure $P_{out}$. Pressure drop $\Delta P_2$ applied in heat exchange zone 6002 is compensated by a particle bed level variation $\Delta P_1$ in reservoir zone 6001 so as to meet the pressure balance according to Equation (1). Active mass particles 603 are discharged through outlet pipe 6014 in form of a siphon positioned in the lower part of heat exchanger 6002.

The fluidized bed level in heat exchanger 6002 can thus vary according to the pressure drop applied by valve 6003, thus allowing heat exchange surface 6020 effectively in contact with the fluidized particle bed to be varied in order to control the heat recovery in exchanger 6002.

According to a variant of this third embodiment, heat exchanger 6002 and reservoir part 6001 can be similar to those described in connection with FIG. 5.

Applications of the CLC Method According to the Invention

In the process, the combustion can be partial or total.

In the case of partial combustion, the active mass/hydrocarbon feed ratio is adjusted so as to achieve partial oxidation of the hydrocarbon feed, producing a syngas in form of a mixture rich in $CO+H_2$. The process can thus be used for syngas production. This syngas can be used as a feed in other chemical conversion processes, for example the Fischer-Tropsch process allowing to produce, from syngas, long hydrocarbon-chain liquid hydrocarbons usable as fuel bases.

If the fluidization gas used in the reduction zone (combustion reactor) is water vapour or a mixture of water vapour and other gas(es), the water gas shift reaction ($CO+H_2O \rightarrow CO_2+H_2$) can also occur, leading to the production of a $CO_2+H_2$ mixture at the reduction zone outlet, which can be used for energy production considering the calorific value thereof, or for hydrogen production, for example for feeding hydrogenation units, refinery hydrotreating units or a hydrogen distribution network (after the water gas shift reaction).

In the case of total combustion, the gas stream at the reduction zone outlet is essentially made up of $CO_2$ and water vapour. A $CO_2$ stream ready to be sequestered can be subsequently obtained through condensation of the water vapour. The production of energy is integrated in the CLC process by heat exchange as described here, but also by possible heat exchange with the cooled fumes.

The invention therefore also relates to a $CO_2$ capture method through total chemical looping combustion in a process according to the invention.

EXAMPLE

The following example allows the invention to be illustrated based on the simulation of operation of a heat exchange control device as described in connection with FIG. 3 and on the use of sand particles as redox active mass particle analogues.

We consider a heat exchanger 3002 containing a fluidized bed of sand with a particle density of 2650 kg/m³, whose average particle diameter is 250 μm. This heat exchanger is filled and drained in such a way that, as long as there is no pressure drop variation through controlled pressure drop application means 3003, the bed level remains constant. This exchanger 3002 is fluidized with overheated water vapour in such a way that the superficial gas velocity in exchanger 3002 is 3 to 6 times the minimum fluidization velocity $u_{mf}$ of the sand. Under the conditions of this example, the minimum fluidization velocity of the sand particles $u_{mf}$ is 0.06 m/s, i.e. a fluidization velocity in the bed of 0.24 m/s. This creates dense bed fluidization conditions promoting thermal exchange.

The heat exchanger is 2 meters in height. The fluidized bed level variations in the heat exchanger presented hereafter relate to a variation in relation to the lower bed level, i.e. the minimum level allowing to provide satisfactory circulation of the solid through the equipment and fluidization thereof.

Table 1 hereafter shows the immersed fraction (in contact with the fluidized bed) of the total heat exchange surface (tube bundles) as a function of the pressure drop applied by controlled pressure drop application means 3003.

TABLE 1

| Pressure drop applied at the gas outlet ΔPv (mbar) | Bed level variation in the exchanger (m) | Immersed heat exchange surface (% total surface) | Heat exchange (% Q_max) | Bed level H_reservoir (m) |
| --- | --- | --- | --- | --- |
| 0 | 2.0 | 100% | 100% | 8 |
| 50 | 1.6 | 81% | 81% | 6 |
| 100 | 1.2 | 62% | 62% | 5 |
| 150 | 0.8 | 42% | 42% | 3 |
| 200 | 0.5 | 23% | 23% | 2 |
| 260 | 0.0 | 0% | 0% | 0 |

The exemplified heat exchange control device thus allows to modulate the heat exchange between 0% and 100% between a solid bed and a heat-carrying fluid without modifying the solid or heat-carrying fluid flow.

The invention claimed is:

1. A process for chemical looping oxidation-reduction combustion of a hydrocarbon feed wherein a redox active mass in form of particles circulates between an oxidation zone and a reduction zone so as to form a circuit, wherein:
    combustion of said hydrocarbon feed is carried out by contacting with the redox active mass particles in the reduction zone,
    the redox active mass particles from the reduction zone are oxidized by contacting with an oxidizing gas stream in the oxidation zone,
    the particles are sent to at least one heat exchanger positioned on a particle transport line between the reduction zone and the oxidation zone, and a fluidization gas is sent into said exchanger so as to create a dense fluidized bed comprising the active mass particles, said heat exchanger comprising a heat exchange surface in contact with the fluidized bed,
    the heat recovery is controlled in said at least one heat exchanger by varying the fluidized bed level through controlled application of a pressure drop on a fluidization gas outlet positioned in an upper part of the heat exchanger,
    wherein the active mass particles are sent to a reservoir zone provided upstream from the heat exchanger, the reservoir zone and the heat exchanger being contained in a single assembly,
    the pressure drop applied in the heat exchanger is compensated by a level variation of an active mass particle bed in the reservoir zone communicating with the fluidized bed of the heat exchanger.

2. A process as claimed in claim 1, wherein:
    the reservoir zone and the heat exchanger are contained in a single enclosure provided with a wall that vertically separates the enclosure into a first part forming the reservoir zone and a second part forming the heat exchanger,
    the reservoir zone communicating with the fluidized bed of the heat exchanger through a passage in the wall of the enclosure.

3. A process as claimed in claim 1, wherein the active mass particles are sent to the at least one heat exchanger through an inlet leg of the heat exchanger, said inlet leg forming the reservoir zone.

4. A process as claimed in claim 1, wherein the active mass particles are discharged from the at least one heat exchanger through a pipe arranged in the lower part of the heat exchanger, said pipe having the form of a siphon.

5. A process as claimed in claim 1, wherein an opening of a mechanical valve positioned on the fluidization gas outlet of the heat exchanger is controlled for controlled application of the pressure drop.

6. A process as claimed in claim 1, wherein a temperature of a controlled pressure drop application means positioned on the fluidization gas outlet outside said heat exchanger is controlled.

7. A process as claimed in claim 6, wherein said controlled pressure drop application means are cooled by contacting with a cooling fluid circulation circuit.

8. A process as claimed in claim 1, wherein the heat exchange is carried out on a transport line carrying the active mass particles from the reduction zone to the oxidation zone.

9. A unit for chemical looping oxidation-reduction combustion of a hydrocarbon feed as claimed in claim 1, comprising:
- a reduction zone for combustion of the hydrocarbon feed on contact with an active mass in form of particles,
- an oxidation zone for oxidation of the active mass particles from the reduction zone on contact with an oxidizing gas stream,
- at least one active mass particles transport line between the reduction zone and the oxidation zone,
- a heat exchange control device comprising:
- a heat exchanger positioned on said at least one transport line and comprising:
- an inlet for an incoming stream of active mass particles,
- fluidization gas injection means for forming a dense fluidized bed of active mass particles,
- an outgoing fluidization gas outlet provided in an upper part of the heat exchanger, said outlet comprising controlled pressure drop application means,
- an outlet for an outgoing stream of active mass particles provided in a lower part of the heat exchanger,
- a heat exchange surface in contact with the dense fluidized particle bed,
- a reservoir zone for compensating the pressure drop applied on the fluidization gas outlet of the heat exchanger, said reservoir zone being positioned on the particle circuit of the chemical loop provided between the reduction zone and the oxidation zone.

10. A unit as claimed in claim 9, wherein the heat exchanger and the reservoir zone comprises a single enclosure provided with a wall that vertically separates said enclosure into a first part forming the reservoir zone upstream from a second part forming the heat exchanger, the wall comprising a passage for the active mass particle bed from the reservoir zone to the heat exchanger, the particles flowing in through a pipe provided in the upper part of the reservoir zone.

11. A unit as claimed in claim 9, wherein the active mass particles flow into the heat exchanger through an inlet leg of the heat exchanger, said inlet leg forming the reservoir zone.

12. A unit as claimed in claim 9, wherein the outgoing particle stream in the heat exchanger flows out through a pipe provided in the lower part of the heat exchanger, said pipe having the form of a siphon.

13. A unit as claimed in claim 9, wherein controlled application of a pressure drop is achieved through a mechanical valve positioned on fluidization gas outlet of the heat exchanger.

14. A unit as claimed in claim 9, wherein the controlled pressure drop application means are arranged on the fluidization gas outlet outside said heat exchanger.

15. A unit as claimed in claim 14, wherein the unit comprises means for cooling said controlled pressure drop application mean.

16. A unit as claimed in claim 9, comprising:
- a first particle transport line for carrying the active mass particles from the reduction zone to the oxidation zone,
- a second particle transport line for carrying the active mass particles from the oxidation zone to the reduction zone, and
- wherein heat exchanger is positioned on at least the first particle transport line.

* * * * *